United States Patent [19]

Kono et al.

[11] Patent Number: 5,528,011
[45] Date of Patent: Jun. 18, 1996

[54] CONTROL SYSTEM OF A C-TYPE WELDING GUN

[75] Inventors: Yuzo Kono; Tetsuya Kojima; Hiroshi Sugawara; Atsuhisa Kawai, all of Tokyo, Japan

[73] Assignee: Obara Corporation, Tokyo, Japan

[21] Appl. No.: 283,952

[22] Filed: Aug. 1, 1994

[30] Foreign Application Priority Data

Feb. 25, 1994 [JP] Japan ..................................... 6-051021

[51] Int. Cl.⁶ .................................................. B23K 11/00
[52] U.S. Cl. .......................................... 219/86.41; 901/42
[58] Field of Search .................................... 219/86.7, 109, 219/110, 86.41; 901/42

[56] References Cited

U.S. PATENT DOCUMENTS

| | | | |
|---|---|---|---|
| 4,841,113 | 6/1989 | Hamada et al. | 219/86.41 |
| 5,340,960 | 8/1994 | Takasaki et al. | 219/86.7 |

FOREIGN PATENT DOCUMENTS 5-18774  3/1993  Japan .

*Primary Examiner*—Clifford C. Shaw
*Attorney, Agent, or Firm*—Flynn, Thiel, Boutell & Tanis

[57] ABSTRACT

A C-type welding gun capable of accurately operating irrespective of the posture of the C-type welding gun without forcibly pressing electrodes to a workpiece and without considering thickness of the workpiece, wear of electrodes, etc. The C-type welding gun includes two servomotors attached to a housing, a C-shaped arm fixed to the housing and a movable arm provided in the housing. A mechanism for converting the rotation of the output shaft of one servomotor into the reciprocal motion of the movable arm is housed in the housing. A mechanism for converting the rotation of the output shaft of the other servomotor into the reciprocal motion of the C-shaped arm is provided between the wrist of the robot and the housing. Both the servomotors are simultaneously actuated while the other servomotor is stopped in response to the signal representing the contact of the electrode of the C-shaped arm to the workpiece.

8 Claims, 1 Drawing Sheet

CONTROL SYSTEM OF A C-TYPE WELDING GUN

BACKGROUND OF THE INVENTION

1. Field of the Invention

The present invention relates to a C-type welding gun to be connected to a wrist of a robot, more particularly to a control system of a C-type welding gun which is driven by servomotors attached to the C-type welding gun.

2. Prior Art

There is known a C-type welding gun which is connected to a wrist of a robot and has a servomotor for driving the C-type welding gun (e.g. as disclosed in Japanese Utility Model Laid-Open Publication No. 5-18774). In this known C-type welding gun, when one ball screw of a movable arm moving mechanism connected to a shaft of the servomotor is rotated by the servomotor, the movable arm moving mechanism is reciprocated so that an electrode disposed in the movable arm moving mechanism is reciprocated. Another ball screw is rotated by the servomotor simultaneously with the rotation of one ball screw by way of a belt so that an equalizing mechanism is rotated, whereby another electrode of a C-shaped arm integrally connected to the equalizing mechanism is reciprocated. The moving amount of the electrode of the movable arm is detected by a moving amount detecting device. When the electrode of the movable arm is moved for a given amount, the rotation of the servomotor is stopped based on an instruction from a controller.

However, in the prior art C-type welding gun, since the weight of the gun is supported by a spring in the equalizing mechanism, the weight of the gun applied to the spring is varied depending on the posture of the gun. Accordingly, there are situations that the spring does not effectively operated depending on the posture of the gun, and hence the equalizing function can not be attained fully. Particularly, in case that the welding gun is directed upward when the posture thereof is varied 180 degrees opposite to the normal posture, the equalizing function cannot be attained at all. Since a single servomotor is stopped when the electrode of the movable arm is moved by a given length, there is a likelihood that there occur the difference of the distance between the electrode of the movable arm and the workpiece and the distance between the electrode of the C-shaped arm and the workpiece or the difference between the deformation of the electrode of the movable arm and that of the C-shaped arm due to the wear thereof depending on the thickness of the electrodes or the lapse of time. As a result, both electrodes do not reach the workpiece at the same time, whereby the electrode which reaches the workpiece first presses the workpiece, leading to the deformation of the workpiece.

SUMMARY OF THE INVENTION

The present invention has been made in view of the problems of the prior art C-type welding gun and has an object to provide a C-type welding gun capable of accurately operating irrespective of the posture of the C-type welding gun without forcibly pressing electrodes to a workpiece.

To achieve the above object, in a C-type welding gun to be connected to a wrist of a robot including a housing wherein the housing includes first and second servomotors attached thereto, a C-shaped arm fixed thereto and having an electrode at one end thereof, a movable arm provided therein and having an electrode at one end thereof, a mechanism provided therein for converting the rotation of an output shaft of the first servomotor into a reciprocal motion of the movable arm and wherein the C-type welding gun further includes a mechanism provided between the wrist of the robot and the housing for converting the rotation of an output shaft of the second servomotor into a reciprocal motion of the C-shaped arm, characterized in that the C-type welding gun further includes a control system having a controller for simultaneously actuating the first and second servomotors and for stopping the operation of the second servomotor in response to a signal issued by a motor circuit representing the contact of the electrode of the C-shaped arm to a workpiece.

In the C-type welding gun having the structure as set forth above, when the welding gun is moved to a welding position by the robot and the electrode of the C-shaped arm and is set at the position relative to the workpiece which position is instructed by the controller, both servomotors are driven or actuated at the same time. When both the servomotors are actuated, the rotation of the output shaft of the first servomotor is changed into a reciprocal motion of the movable arm so that the electrode of the movable arm is approached to the workpiece while the rotation of the output shaft of the second servomotor is changed into a reciprocal motion of the C-shaped arm so that the electrode of the C-shaped arm is also approached to the workpiece. Since the electrode of the C-shaped arm is set to the given position as set forth above, the electrode of the C-shaped arm contacts the workpiece at the same time when the electrode of the movable arm contacts the workpiece or earlier than when the movable arm electrode contacts the workpiece. Since the contact of the electrode of the C-shaped arm to the workpiece can be detected by a pulse signal, etc. which is interlocked with the rotation of the other servomotor, the other servomotor can be stopped in response to the pulse signal, etc. Accordingly, there is no likelihood that stress is forcibly applied to the workpiece when the electrode of the C-shaped arm contacts the workpiece. At this time, if the electrode of the movable arm contacts the workpiece at the same time when the electrode of the C-shaped arm contacts the workpiece, pressure application operation against the workpiece is immediately performed by one servomotor. On the other hand, if the electrode of the movable arm does not contact the workpiece, the electrode of the movable arm is continuously approached to the workpiece by one servomotor and thereafter the pressure application operation against the workpiece is performed by the first servomotor.

PREFERRED EMBODIMENT OF THE INVENTION

Figure 1:
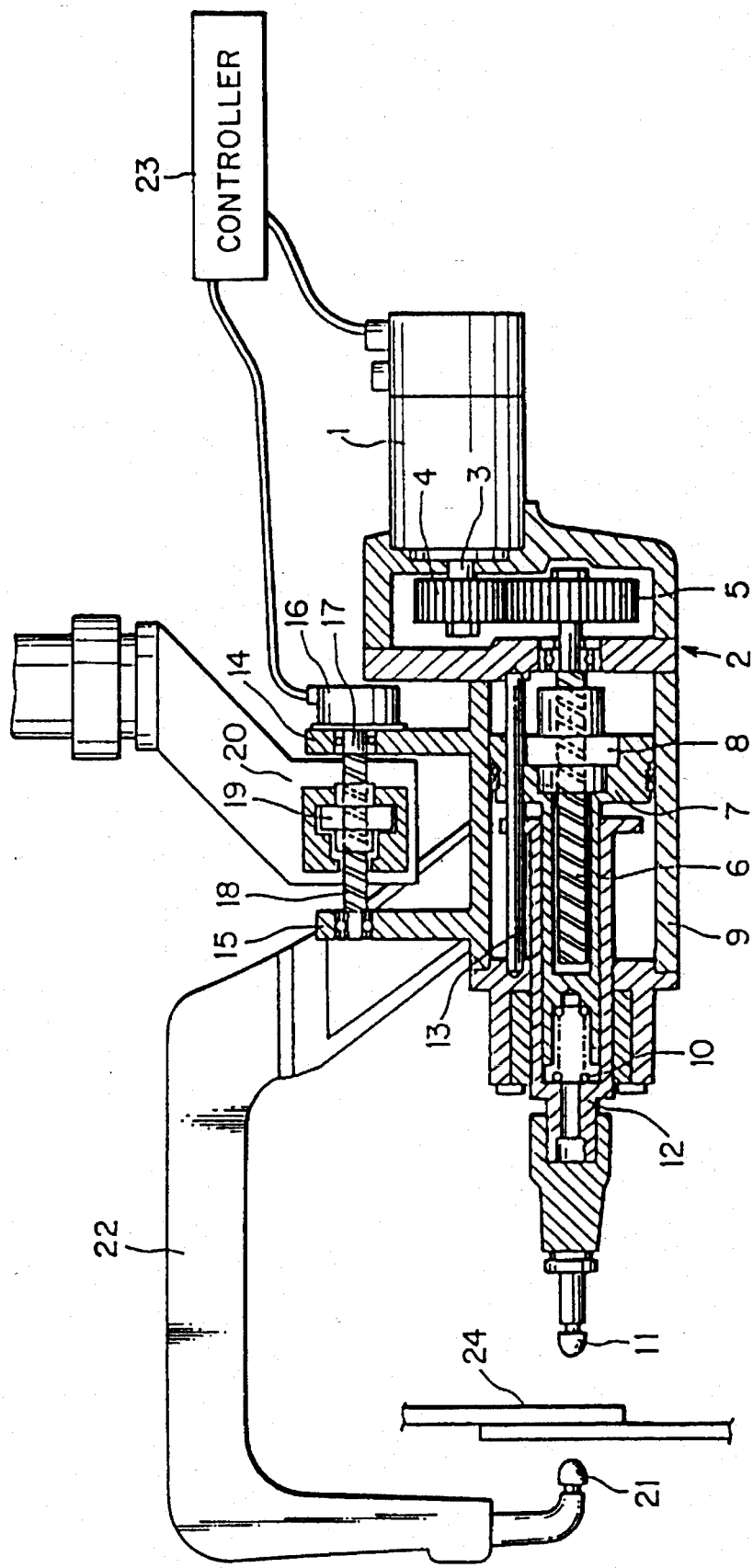
FIG. 1 is a partially cross-sectional side view of a C-type welding gun.

A control system of a C-type welding gun according to a preferred embodiment of the invention will be describe with reference to FIG. 1.

Denoted at 1 is a servomotor attached to and held by a housing 2. A gear 4 is attached to an output shaft 3 of the servomotor 1 and a screw shaft 6 is attached to a gear 5 meshing the gear 4. Denoted at 7 is a holder for holding a nut 8 meshing the screw shaft 6.

The holder 7 is slidably disposed in a cylinder 9, which is formed in the housing 2, at the rear thereof. The holder 7 has a cylindrical body at the middle portion thereof into which the screwshaft 6 is inserted and a spring 10 which is held by a front end thereof. A movable arm 12 having an electrode 11 at the tip end thereof is slidably inserted into the cylindrical portion and an outer peripheral surface of the front end portion of the holder 7.

An outer periphery of the movable arm 12 is slidably disposed relative to the cylinder 9 formed in the housing 2. The movable arm 12 and the holder 7 are respectively inserted over a rotation stopping rod 13 which is supported by the cylinder 9 so as not to rotate.

Brackets 14 and 15 are provided at the outside of the cylinder 9 formed in the housing 2. A servomotor 16 is attached to and held by the bracket 14. A screw shaft 18 is connected to an output shaft 17 of the servomotor 16 and the screw shaft 18 is rotatably supported between and by the brackets 14 and 15.

A nut 19 meshing the screw shaft 18 is fixed to a wrist 20 of a robot. A C-shaped arm 22 having an electrode 21 at the tip end thereof serving as a fixed arm is fixed to the outside of the cylinder 9 formed in the housing 2.

Denoted at 23 is a controller board or a controller attached to a robot controller for controlling the servomotors 1 and 16, more particularly for controlling to simultaneously actuate the servomotors 1 and 16, to stop the servomotor 16 and to stop the servomotor 1 after the pressure application operation is performed.

In the C-type welding gun, the welding gun is moved to the welding position by the wrist 20 of the robot whereby the electrode 21 of the C-shaped arm 22 is located at the position relative to a workpiece 24 as instructed by the controller 23. This position is preferably one where the electrode 21 of the C-shaped arm is instructed by the controller 23 so that both the electrodes 11 and 21 are moved away from the workpiece 24 by the same interval as close as possible. The distance between the electrode 11 of the movable arm 12 and the workpiece 24 is set not to be shorter than the distance between the electrode 21 of the C-shaped arm 22 and the workpiece 24. At this state, both the servomotors 1 and 16 are simultaneously actuated by the controller 23.

When both the servomotors 1 and 16 are actuated, the rotation of the output shaft 3 of servomotor 1 is transmitted from the gear 4 to the gear 5 so that the rotation of the gear 5 rotates the screw shaft 6. As a result, the holder 7 is moved forward by the nut 8, thereby moving the movable arm 12 forward so that the electrode 11 approaches the workpiece 24. At the same time, the rotation of the output shaft 17 of the servomotor 16 rotates the screw shaft 18. The rotation of the screw shaft 18 operates so as to move the housing 2 rearward (upward in FIG. 1) by the nut 19 fixed to the wrist 20 of the robot. As a result, the C-shaped arm 22 fixed to the housing 2 is moved rearward together with the housing 2 so that the electrode 21 of the C-shaped arm 22 is approached to the workpiece 24.

Since the electrode 21 of the C-shaped arm 22 is set to the given position as set forth above, the electrode 21 of the C-shaped arm 22 contacts the workpiece 24 at the same time when the electrode 11 of the movable arm 12 contacts the workpiece 24 or earlier than the time when the electrode 11 of the movable arm 12 contacts the workpiece 24. Since the contact of the electrode 21 of the C-shaped arm 22 to the workpiece 24 can be detected by a pulse signal, etc. which is generated by the rotation of servomotor 16, the actuation of servomotor 16 can be stopped by the controller 23 in response to the pulse signal which is issued by a motor circuit, not shown, and the like. As mentioned above, since the electrode 21 of the C-shaped arm 22 which contacts the workpiece 24 is fixed to the housing 2 of the welding gun to be connected to the wrist 20 of the robot and the controller 23 stops the approaching motion of the electrode 21 relative to the workpiece 24 at the same time when the electrode 21 contacts the workpiece 24, stress is not forcibly applied to the workpiece 24 by the electrode 21.

When the electrode 11 of the movable arm 12 contacts the workpiece 24 after the servomotor 16 is stopped, pressure application operation relative to the workpiece 24 is immediately performed by one servomotor 1. On the other hand, if the electrode 11 of the movable arm 12 does not contact the workpiece 24, the electrode 11 of the movable arm 12 is continuously approaches the workpiece 24 due to the continual activation of servomotor 1 and thereafter the pressure application against the workpiece 24 is performed by servomotor 1.

When the pressure application operation relative to the workpiece 24 by servomotor 1 is completed, the welding operation relative to the workpiece 24 is performed. When the welding operation is completed, both the servomotors 1 and 16 are actuated by the controller 23, thereby releasing both the electrodes 11 and 21 from the workpiece 24.

According to the present invention, two servomotors are attached to the housing of the welding gun and the C-shaped arm is fixed to the housing and the movable arm is provided in the housing. The mechanism for converting the rotation of the output shaft of servomotor 1 into the reciprocal motion of the movable arm is housed in the housing. The mechanism for converting the rotation of the output shaft of the servomotor 16 into the reciprocal motion of the C-shaped arm is provided between the wrist of the robot and the housing. Both the servomotors are simultaneously actuated while the other servomotor is stopped in response to the signal representing the contact of the electrode of the C-shaped arm to the workpiece. As a result, it is possible to obtain the C-type welding gun capable of accurately operating irrespective of the orientation of the welding gun, without forcibly pressing the electrodes to a workpiece and without considering thickness of the workpiece, wear of the electrodes, etc.

Since the second servomotor, servomotor 16, is actuated only by the motion of the welding gun relative to the wrist of the robot, the output power of servomotor 16 may be smaller than that of first servomotor, servomotor 1.

What is claimed is:

1. A welding gun configured to be positioned against a workpiece by a robotic arm, said welding gun including:

a housing configured for attachment to the robotic arm;

a curved arm attached to said housing, said curved arm having an end spaced from said housing and having an electrode at said end directed toward said housing;

a movable arm attached to said housing, said movable arm having an electrode attached thereto, said movable arm electrode being directed toward said curved arm electrode;

a first servomotor attached to said housing, said first servomotor having a drive mechanism for reciprocally moving said movable arm towards said curved arm electrode;

a second servomotor attached to said housing, said second servomotor having a drive mechanism for reciprocally moving said housing and said curved arm relative to the robotic arm;

a signal generator for selectively generating a signal when said curved arm electrode contacts the workpiece; and a controller configured to receive said signal produced by said signal generator, to simultaneously actuate said first and second servomotors so that said electrodes simultaneously approach the workpiece and to stop said actuation of said second servomotor in response to receipt of said signal from said signal generator.

2. The welding gun of claim 1, wherein said electrodes are configured to concurrently contact the workpiece.

3. The welding gun of claim 1, wherein the electrodes are configured so that said movable arm electrode contacts the workpiece after said curved arm electrode contacts the workpiece and said first servomotor is sensitive to the pressure of said movable arm electrode contacting workpiece and is configured to stop actuation when said movable arm electrode contacts the workpiece.

4. The welding gun of claim 1, wherein said curved arm has a generally C-shaped profile.

5. The welding gun of claim 1, wherein said second servomotor is configured to function as said signal generator to generate said signal to said controller when said curved arm electrode contacts the workpiece.

6. The welding gun of claim 5, wherein said electrodes are configured to concurrently contact the workpiece.

7. The welding gun of claim 5, wherein the electrodes are configured so that said movable arm electrode contacts the workpiece after said curved arm electrode contacts the workpiece and said first servomotor is sensitive to the pressure of said movable arm electrode contacting workpiece and is configured to stop actuation when said movable arm electrode contacts the workpiece.

8. The welding gun of claim 5, wherein said curved arm has a generally C-shaped profile.

* * * * *